Patented Dec. 22, 1953

2,663,666

UNITED STATES PATENT OFFICE 2,663,666

PROCESS OF PREPARING CRYSTALLINE INSULIN FROM ACID ALCOHOLIC EXTRACTS OF PANCREAS GLANDS

Jan Daniël Herman Homan, Oss, Netherlands, assignor to Organon Inc., Orange, N. J., a corporation of New Jersey No Drawing. Application March 15, 1950, Serial No. 149,885

Claims priority, application Netherlands March 31, 1949

3 Claims. (Cl. 167—75)

It is known that insulin can be inactivated by compounds with thiol groups (vide K. Freudenberg and H. Eyer; Z. Physiol. Chem. 213, 226 (1932)). Furthermore it has been shown that this inactivation consists in an irreversible reduction of the insulin (V. du Vigneaud, A. Fitch, E. Pekarek and W. Wayne Lockwood, J. Biol. Chem. 94, 233 (1931–1932)). Only part of the —S—S groups present in the insulin molecule needs to be reduced to cause a complete loss of activity.

According to the known processes for the preparation of insulin, vide e. g. R. G. Romans, D. A. Scott and A. M. Fisher; Ind. Eng. Chem. 32, 908 (1940), ground pancreas glands are extracted in an alcoholic medium of about 70% alcohol in the presence of hydrochloric acid, in order to obtain a sufficiently high degree of acidity. The remaining gland tissue is then generally removed by centrifuging. Dependent on the kind of pancreas used the extract obtained in this way contains a more or less high degree suspended mucous and fibrous material (0.5–2% dry material) which cannot be separated with the aid of a centrifuge, such as is generally used for separating remaining gland tissue (basket-centrifuge) and which can but be removed by filtration with the greatest difficulty. According to these processes this finely suspended material is, together with other material, caused to flocculate by adjusting the pH of the acid extract to a value of 7–8, whereupon the precipitate can easily be filtered. It was found that these conditions of degree of acidity and alcohol content are extremely favorable to a quick reduction of the insulin by impurities in the extract. Experience taught that, when applying this known method of purification a great loss of insulin occurs. After acidifying the filtrate, the alcohol is removed by distillation in vacuo and fatty impurities are removed before or after salting out the insulin containing solution; the protein-like mass thus obtained is further treated to obtain pure insulin. According to another known purification method, vide the British patent specification 566,351, the alcohol content of acid alcoholic pancreas extracts is reduced to a value at which the fatty constituents are no longer soluble, at a pH=4–6 and at the same time nearly all dissolved and suspended substances precipitate. This value of the alcohol content lies in the range of 20–40 vol. per cent.

The applicant found that in working along these lines a considerable loss of insulin occurs, because a great part of the total originally present quantity of insulin is adsorbed on the precipitate and cannot easily be removed therefrom by washing out.

It was now found that the finely suspended material which remains after separation of the coarser remaining gland tissue from the acid pancreas extract, possesses under certain circumstances strongly reducing properties and that, after the former has been removed, which renders the extract clear or weakly opalescent, a very effective purification can be effected by reducing the alcohol content to a value, at which the reducing material dissolved in the extract, after the pH has been adjusted to a value of about 4–5.5, becomes nearly insoluble and there occurs but a very slight adsorption of insulin on the precipitated material which is removed, whereupon the liquid is adjusted to a higher pH, in order to precipitate non-fatty waste materials which would hamper the further process.

The preceding removal of the fine, suspended reducing material which is essential for the mechanical practicability of the purification following thereon, may be executed either simultaneously with the removal of the undissolved coarse bulk of the raw pancreas extract, or after this bulk has been already removed. To this end high speed centrifuges are used of known constructions (cup centrifuge, Sharpless centrifuge, de Laval separator). The total reducing capacity of the acid pancreas extracts is in this way already considerably decreased. Preferably a temperature beneath about 15° C. is applied to this end.

The acid pancreas extracts, obtained in the manner described above in a clear or weakly opalescent state, can be easily freed from the dissolved reducing material, by reducing the alcohol content of these extracts, preferably to 47–52 vol. per cent, followed by adjustment of the pH to a value of 4–5.5. Under these circumstances the reducing material is but very slightly soluble and the reduction of the insulin can only take place to a very slight degree, whereas but small quantities of insulin can be adsorbed on the precipitated material. This purification is particularly successful, the insulin loss being practically nil.

The insulin containing solution, obtained by reducing the alcohol content of the clear or slightly opalescent pancreas extract to 47–52% and by filtering after adjustment of the pH at a value of 4–5.5 contains besides fatty material, still a non-fatty fraction which might cause loss of insulin during subsequent purification processes. This fraction, however, can be precipitated from this filtrate by adjusting the pH to a value of 7–8.5 but now without a substantial loss of insulin, because the reducing material has been practically completely removed beforehand. The precipitate is then filtered off. In a way known per se the alcohol can be distilled in vacuo from the filtrate after acidification, then the fat and other dispersed material can be removed by filtering and the filtrate can be further treated with a view of isolating insulin.

The following example is given for elucidating the process according to the invention:

*Example*

Pancreas glands of cows are extracted twice according to the normal methods in the presence of hydrochloric acid in an alcoholic medium of about 70% alcohol. The separation of remaining gland tissue is effected with a basket-centrifuge of normal type. The still turbid extracts thus obtained are combined, cooled down to 10° C. and the turbidities are removed with a de Laval separator giving a slightly opalescent liquid. This liquid is distilled in vacuo at a temperature beneath 20° C. until its alcohol content is 49%. The pH of the insulin containing liquid is then adjusted to 5 and the formed precipitate is then removed with a filter press. The crystal clear filtrate is then adjusted to pH=8, which again causes a precipitate. After filtration the liquid is acidified until a pH value of 3.3 is reached and distilled in vacuo till the alcohol is completely removed. The liquid thus obtained is freed from fat and other dispersed material by filtering through fine paper fibres. Purified insulin is isolated from said clear filtrate according to methods known per se, as described, for instance, in the above mentioned British Patent 566,351. The yield is 1500–3000 units of insulin crystals per kilogram starting material, dependent on the kind of the latter.

Having now particularly described and ascertained the nature of my said invention and in what manner same is to be performed, what I claim is:

1. In a process of preparing crystalline insulin from clear to opalescent acid alcoholic extracts of pancreas glands, the steps comprising reducing the alcohol content of said extract to not less than 47% and not more than 52%, adjusting the pH value of said extract to between about 4.0 and about 5.5 thereby precipitating the reducing material present in said extract and removing the formed precipitate.

2. In a process of preparing crystalline insulin from clear to opalescent acid alcoholic extracts of pancreas glands, the steps comprising reducing the alcohol content of said extract to not less than 47% and not more than 52%, adjusting the pH value of said extract to between about 4.0 and about 5.5 thereby precipitating the reducing material present in said extract, removing the formed precipitate, adjusting the pH value to between about 7.0 to about 8.5 and removing the formed precipitate.

3. In a process of preparing crystalline insulin from clear to opalescent alcoholic extracts of pancreas glands, the steps comprising reducing the alcoholic content of said extract to not less than 47% and not more than 52%, adjusting the pH value of said extract to between about 4.0 and about 5.5 thereby precipitating the reducing material present in said extract, removing the formed precipitate, adjusting the pH value to between about 7.0 and about 8.5, removing the formed precipitate, acidifying the resulting solution to a pH of between about 3.0 and about 3.5, distilling off the alcohol present in said solution, removing the precipitate obtained thereby and recovering from the resulting solution crystalline insulin.

JAN DANIËL HERMAN HOMAN.

References Cited in the file of this patent

UNITED STATES PATENTS

| Number | Name | Date |
| --- | --- | --- |
| 2,174,862 | Sahyun | Oct. 3, 1939 |
| 2,353,016 | Daughenbaugh | July 4, 1944 |

FOREIGN PATENTS

| Number | Country | Date |
| --- | --- | --- |
| 566,351 | Great Britain | Dec. 27, 1944 |

OTHER REFERENCES

Somogyi in J. Biol. Chem., volume 60, 1924, pages 36 and 37.